(12) United States Patent
Nakamura et al.

(10) Patent No.: US 12,466,646 B2
(45) Date of Patent: Nov. 11, 2025

(54) ARTICLE STORAGE FACILITY

(71) Applicant: Daifuku Co., Ltd., Osaka (JP)

(72) Inventors: Takanori Nakamura, Hinocho (JP);
Kazuharu Yoshinaga, Hinocho (JP)

(73) Assignee: Daifuku Co., Ltd., Osaka (JP)

( * ) Notice: Subject to any disclaimer, the term of this patent is extended or adjusted under 35 U.S.C. 154(b) by 348 days.

(21) Appl. No.: 18/212,782

(22) Filed: Jun. 22, 2023

(65) Prior Publication Data

US 2023/0415991 A1 Dec. 28, 2023

(30) Foreign Application Priority Data

Jun. 23, 2022 (JP) ................. 2022-101171

(51) Int. Cl.
*B65G 1/04* (2006.01)
(52) U.S. Cl.
CPC ......... *B65G 1/0492* (2013.01); *B65G 1/0414* (2013.01)
(58) Field of Classification Search
CPC .................................................. B65G 1/0414
See application file for complete search history.

(56) References Cited

U.S. PATENT DOCUMENTS

| 5,148,889 | A  | * | 9/1992  | Fenwick  | ............... | E06C 9/12 |
|           |    |   |         |          |                 | 182/115 |
| 6,149,366 | A  | * | 11/2000 | Deandrea | ............. | B65G 1/0414 |
|           |    |   |         |          |                 | 414/279 |
| 6,929,440 | B1 | * | 8/2005  | Grond    | ................. | B65G 1/0492 |
|           |    |   |         |          |                 | 414/284 |
| 9,499,339 | B2 | * | 11/2016 | Roberto  | ............... | B65G 1/0492 |
| 10,106,323| B2 | * | 10/2018 | Terrill  | ...................... | B62B 3/06 |

FOREIGN PATENT DOCUMENTS

JP 6518376 B1 5/2019

* cited by examiner

*Primary Examiner* — Jonathan Snelting
(74) *Attorney, Agent, or Firm* — The Webb Law Firm

(57) ABSTRACT

A holding device with a holder holding an operation vehicle is transported by a transporter from a loader and is placed on a mount located along a travel path. The state of the holder in the holding device placed on the mount is changed to a non-holding state and an elevator lowers the operation vehicle to place the operation vehicle on the travel path.

8 Claims, 12 Drawing Sheets

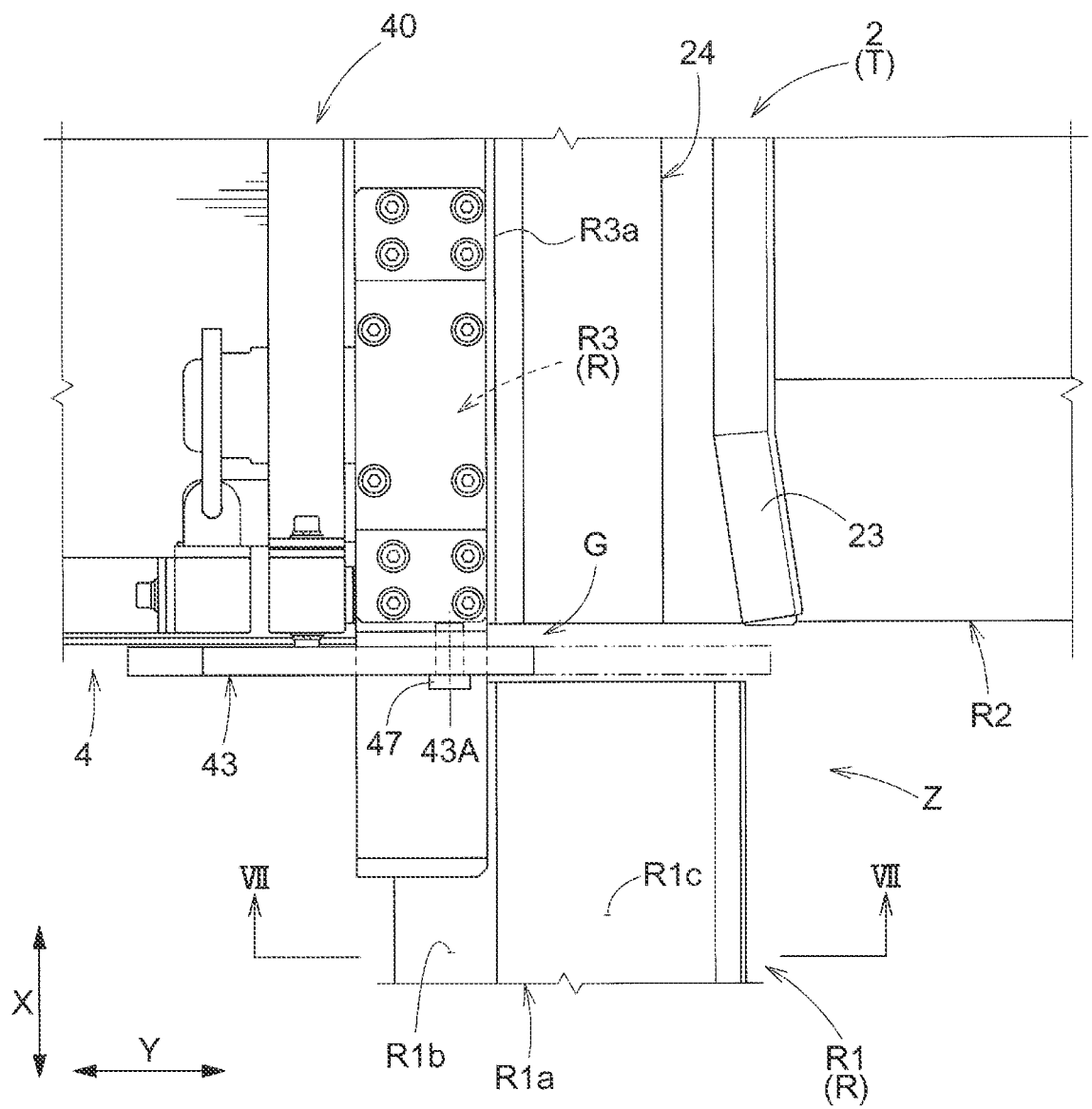

ARTICLE STORAGE FACILITY

CROSS-REFERENCE TO RELATED APPLICATION

This application claims priority to Japanese Patent Application No. 2022-101171 filed Jun. 23, 2022, the disclosure of which is hereby incorporated by reference in its entirety.

BACKGROUND OF THE INVENTION

Field of the Invention

The present invention relates to an article storage facility including a transport vehicle that transports an article, an article storage that stores the article transported by the transport vehicle, and a transporter that transports the article from a loader to the transport vehicle.

Description of Related Art

An example of such an article storage facility is described in Japanese Patent No. 6518376 (Patent Literature 1). Reference signs in parentheses used below in describing the background are the reference signs in Patent Literature 1.

The article storage facility described in Patent Literature 1 includes transport vehicles (14) that travel along paths including rails (40) to transport articles (12). The facility includes storages located on the rails (40) to store articles (12). The transport vehicles (14) transport articles (12) to the storages on the rails (40).

In the article storage facility described in Patent Literature 1, an operation such as maintenance is performed in an area on or around a rail (40), which is referred to as an operation area. To perform such an operation, an operation vehicle (16) for carrying an operator (8) is placed in the operation area. The operator (8) on the operation vehicle (16) operates the operation vehicle (16) to travel along the rail (40). The operator (8) can thus perform maintenance or other operations in the operation area while moving along the rail (40).

In the article storage facility described in Patent Literature 1, the operation vehicle (16) is transported to the operation area using an elevator (36) and a third vehicle (18). However, the operation vehicle (16) that is heavy and has wheels cannot be easily lifted and placed onto the elevator (36). The operation vehicle (16) is under inertia or vibration generated when being transported by the elevator (36) and the third vehicle (18). The operation vehicle (16) with wheels (16f) includes a brake (16m) but may not be supported stably and immovably relative to the elevator (36) or the third vehicle (18) under inertia or vibration.

SUMMARY OF THE INVENTION

In response to the above, a technique is awaited for easily transporting the operation vehicle to the operation area.

A technique responding to the above issue has the structure described below.

An article storage facility includes a transport vehicle that travels along a travel path to transport an article, an article storage that stores the article transported by the transport vehicle, a transporter that transports the article from a loader to the transport vehicle, an operation vehicle that travels and carries an operator along the travel path along which the transport vehicle travels, and a holding device including a holder that holds the operation vehicle and an elevator that lifts and lowers the operation vehicle. The holder has a state changeable between a holding state in which the holder holds the operation vehicle and a non-holding state in which the holder does not hold the operation vehicle. The holding device with the holder holding the operation vehicle is transported by the transporter from the loader and is placed on a mount located along the travel path. The state of the holder in the holding device placed on the mount is changed to the non-holding state and the elevator lowers the operation vehicle to place the operation vehicle on the travel path.

With this structure, the transporter can transport the operation vehicle held by the holding device. The operation vehicle is thus held more stably than when directly supported on the transporter during transport. When the transporter places the holding device on the mount located along the travel path, the operation vehicle held by the holding device is at the position corresponding to the travel path. In this state, the state of the holder is changed to the non-holding state and the elevator lowers the operation vehicle to place the operation vehicle on the travel path. This completes placement of the operation vehicle in the operation area. The above structure thus allows easy transport of the operation vehicle to the operation area.

Further aspects and features of the technique according to the present disclosure will be apparent from exemplary and nonlimiting embodiments described below with reference to the drawings.

BRIEF DESCRIPTION OF THE DRAWINGS

FIG. 6 is a plan view of a switcher.

DESCRIPTION OF THE INVENTION

First Embodiment

An article storage facility according to a first embodiment will now be described with reference to the drawings.

A predetermined horizontal direction is hereafter referred to as a first direction X. A direction intersecting with the first direction X when viewed from above or below is hereafter referred to as a second direction Y. In the present embodiment, the first direction X and the second direction Y are perpendicular to each other when viewed from above or below.

Figure 1:
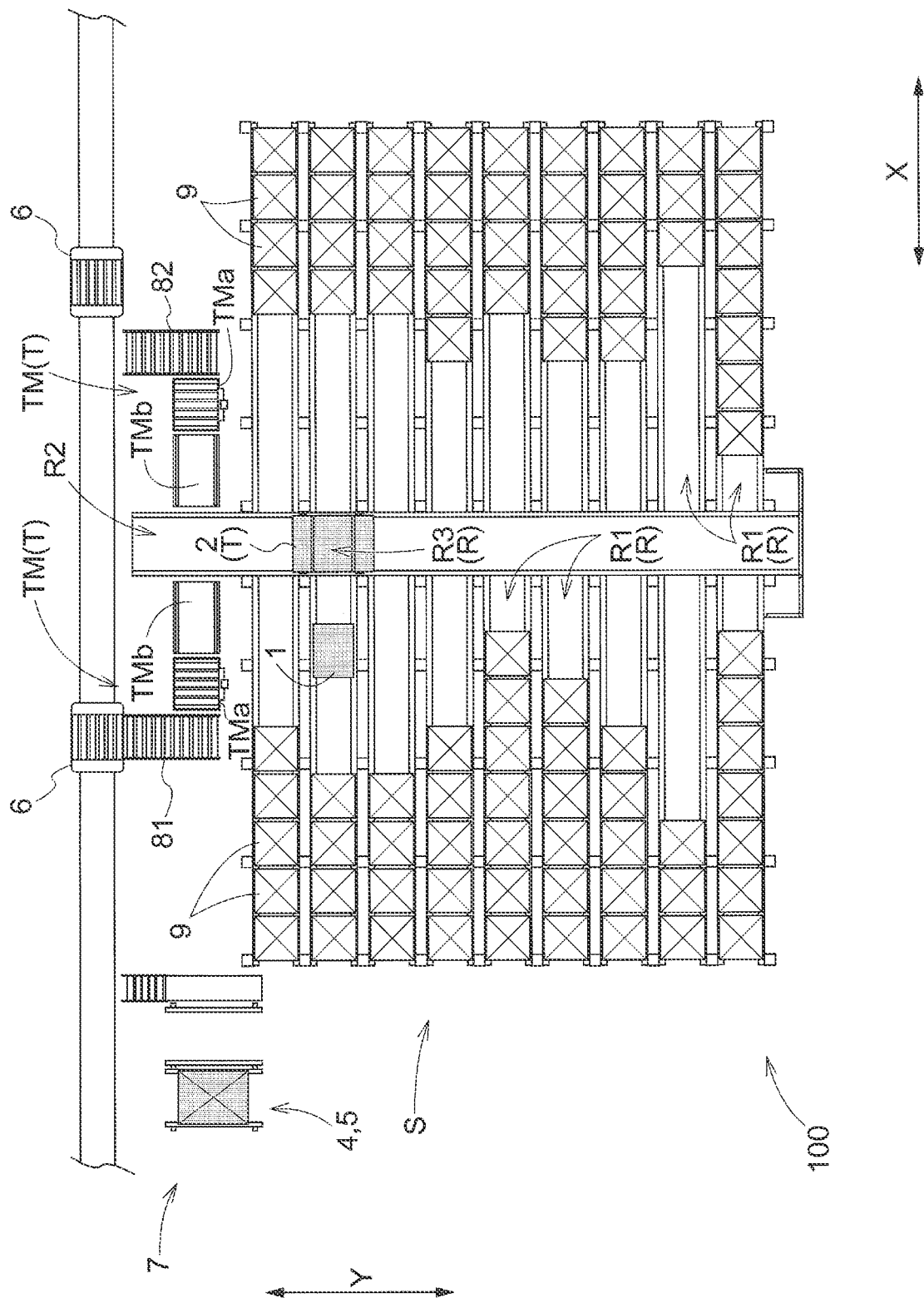
FIG. 1 is a plan view of an article storage facility.

As shown in FIG. 1, an article storage facility 100 includes a transport vehicle 1 (corresponding to a first transport vehicle 1 described later) that travels along travel paths R to transport articles 9, an article storage S that stores the articles 9 transported by the transport vehicle 1, and a transporter T that transports the articles 9 from a loader 81 (corresponding to a loading conveyor 81 described later) to the transport vehicle 1.

In the present embodiment, the article storage facility 100 includes a first travel path R1, a second travel path R2, and a third travel path R3. The first travel path R1 and the third travel path R3 each correspond to a travel path. The second travel path R2 is different from the travel path. In this example, the first travel path R1 and the third travel path R3 extend in the first direction X. The second travel path R2 extends in the second direction Y. In other words, the first direction X corresponds to a path extending direction in which the travel path R extends. The second direction Y corresponds to a path width direction perpendicular to the path extending direction when viewed from above or below. The first direction X may be hereafter referred to as a path extending direction X. The second direction Y may be referred to as a path width direction Y.

In the present embodiment, the article storage S includes multiple first travel paths R1 and multiple second travel paths R2. The article storage S stores the articles 9 on the first travel paths R1.

As described below, each first travel path R1 is the travel path R along which the first transport vehicle 1 (transport vehicle 1) travels, and extends in the first direction X. Each second travel path R2 is a path along which a second transport vehicle 2 travels, and extends in the second direction Y. In this manner, the article storage S in the present embodiment includes the first travel paths R1 (travel path R) along which the first transport vehicle 1 (transport vehicle 1) travels, and the second travel paths R2 extending in the direction (the second direction Y in this example) intersecting with the first travel paths R1 when viewed from above or below.

In the present embodiment, the first travel paths R1 are located across a second travel path R2 in the first direction X and arranged in the second direction Y. Sets of multiple first travel paths R1 and a single second travel path R2 are included in each of multiple shelves in the article storage S. In other words, the article storage S in this example includes multiple shelves each including the multiple first travel paths R1 and the single second travel path R2. As described below, the third travel path R3 is a part of the second transport vehicle 2 (refer also to FIG. 2) and is movable in the second direction Y as the second transport vehicle 2 travels.

In the present embodiment, the article storage facility 100 includes the first transport vehicle 1, the second transport vehicle 2, and an intermediate transport assembly TM. The article storage facility 100 also includes the loading conveyor 81 and an unloading conveyor 82. The first transport vehicle 1 corresponds to a transport vehicle. The second transport vehicle 2 and the intermediate transport assembly TM are included in a transporter. The loading conveyor 81 corresponds to a loader. The unloading conveyor 82 corresponds to, for example, an unloader.

Figure 2:
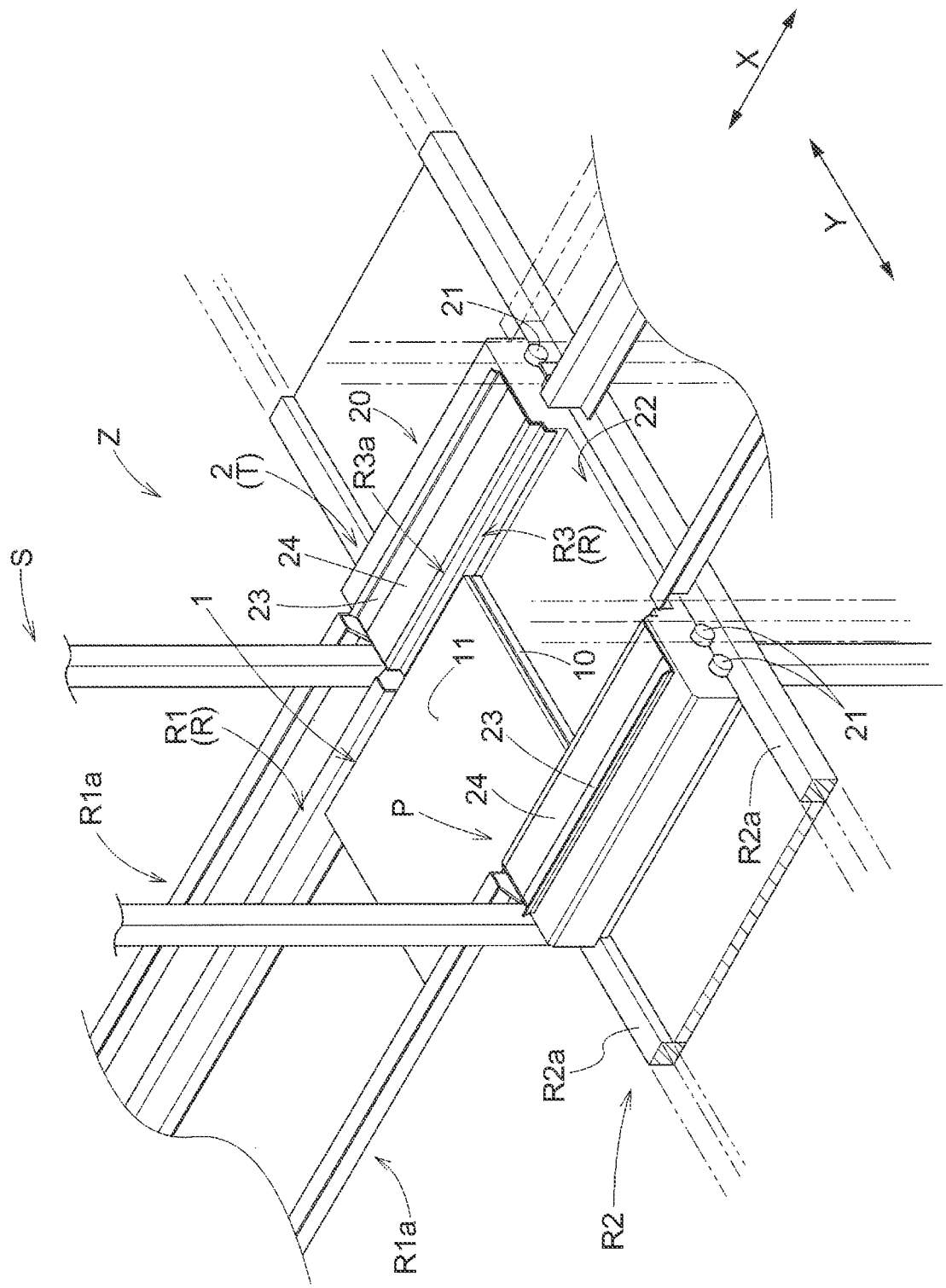
FIG. 2 is a perspective view of transport vehicles.

As shown in FIG. 2, the first transport vehicle 1 travels along the first travel path R1 and the third travel path R3. The first travel path R1 and the third travel path R3 each include rails on which the first transport vehicle 1 travels.

The first travel path R1 includes first rails R1a. The third travel path R3 includes third rails R3a. The first rails R1a and the third rails R3a each correspond to a rail.

The first transport vehicle 1 includes a body 10, travel wheels (not shown) on the body and an article placement portion 11 on which the article 9 (not shown in FIG. 2) is placeable. The first transport vehicle 1 travels along the first travel path R1 with the article 9 placed on the first transport vehicle 1. The article 9 placed on the first transport vehicle 1 is thus transported along the first travel path R1 as the first transport vehicle 1 travels.

The second transport vehicle 2 travels along the second travel path R2. The second travel path R2 includes second rails R2a on which the second transport vehicle 2 travels.

The second transport vehicle 2 includes a body 20 and travel wheels 21 on the body 20. In the present embodiment, the second transport vehicle 2 includes a vehicle placement portion 22 on which the first transport vehicle 1 is placeable, and the third travel path R3 (travel path R) located on the vehicle placement portion 22. The second transport vehicle 2 travels along the second travel path R2 with the first transport vehicle 1 placed on the second transport vehicle 2. The article 9 on the first transport vehicle 1 placed on the second transport vehicle 2 is thus transported along the second travel path R2 as the second transport vehicle 2 travels. In the present embodiment, the second transport vehicle 2 includes article mounts 24 on which the article 9 is placeable. In this example, the article mounts 24 are located adjacent to two outer portions of the vehicle placement portion 22 in the second direction Y. While the second transport vehicle 2 is transporting the article 9, the article 9 is placed on the article mounts 24 or on the article placement portion 11 of the first transport vehicle 1 on the second transport vehicle 2. In the present embodiment, the article mounts 24 are included in a conveyor that transports the article 9 in the first direction X. The article mounts 24 are the upper surface of the conveyor on which the article 9 is transported. As described below, the conveyor including the article mounts 24 in the present embodiment is operated to load and unload the article 9 or the holding device 5 (described later) to and from the second transport vehicle 2.

The second transport vehicle 2 travels along the second travel path R2 and stops at a position adjacent to the first travel path R1 (specifically, the start end of the first travel path R1). In this stopped state, the third travel path R3 on the second transport vehicle 2 is aligned with and continuous with the first travel path R1 (in the first direction X in this example). The first transport vehicle 1 placed on the second transport vehicle 2 can then travel between the third travel path R3 and the first travel path R1. The first transport vehicle 1 with the article 9 travels along the third travel path R3 on the second transport vehicle 2 to separate from the second transport vehicle 2 and enter the first travel path R1. The first transport vehicle 1 then travels along the first travel path R1 to transport the article 9.

In the present embodiment, the first transport vehicle 1 and the second transport vehicle 2 are located on each shelf in the article storage S. The first transport vehicle 1 on each shelf in the article storage S travels along the first travel path R1 on the corresponding shelf. The second transport vehicle 2 on each shelf in the article storage S travels along the second travel path R2 on the corresponding shelf.

As shown in FIG. 1, the intermediate transport assembly TM in the present embodiment is located on the path between the loading conveyor 81 and the second transport vehicle 2. The intermediate transport assembly TM receives the article 9 from the loading conveyor 81 and transports the article 9 to the second transport vehicle 2. In this manner, the transporter T in the present embodiment includes the second transport vehicle 2 that travels along the second travel path R2, and the intermediate transport assembly TM that transports the article 9 from the loading conveyor 81 (loader) to the second transport vehicle 2.

To load the article 9 into the article storage S, the loading conveyor 81 delivers the article 9 to the intermediate transport assembly TM, which then delivers the article 9 to the second transport vehicle 2. The article 9 is thus placed on the second transport vehicle 2. FIG. 1 shows the first transport vehicle 1 traveling separately from the second transport vehicle 2. The article 9 is transported along the second travel path R2 by the second transport vehicle 2, and along the first travel path R1 by the first transport vehicle 1 separated from the second transport vehicle 2. The article 9 is stored at any position on the first travel path R1. This completes loading of the article 9 into the article storage S. To unload the article 9 from the article storage S, the above operations are performed in the reverse order by the devices. For unloading, however, the unloading conveyor 82 is used instead of the loading conveyor 81 in this example. The second transport vehicle 2 delivers the article 9 to the intermediate transport assembly TM, which then delivers the article 9 to the unloading conveyor 82. In the present embodiment, the conveyor including the article mounts 24 on the second transport vehicle 2 is operated to load and unload the article 9 to and from the second transport vehicle 2.

As shown in FIG. 1, the intermediate transport assembly TM in the present embodiment includes a lifting device TMa that lifts and lowers the article 9 across the shelves in the article storage S, and relay conveyors TMb each located at the corresponding shelf in the article storage S at a position adjacent to the lifting device TMa when viewed from above or below. Each relay conveyor TMb at the corresponding shelf transports the article 9 between the lifting device TMa and the second transport vehicle 2 located on this shelf.

As described above, the article storage facility 100 transports the articles 9 using the first transport vehicle 1, the second transport vehicle 2 (transporter T), and the intermediate transport assembly TM (transporter T), and loads and unloads the articles 9 to and from the article storage S. Although not illustrated in detail, the articles 9 include, for example, pallets and loads placed on the pallets.

The article storage facility 100 may undergo, for example, the collapse of articles in the article storage S, or may be to receive maintenance. In such a case, an operator performs, for example, correction of the load positions or maintenance (hereafter simply referred to as an operation). To perform an operation, the operator moves to the operation area in which the operation is to be performed.

Figure 3:
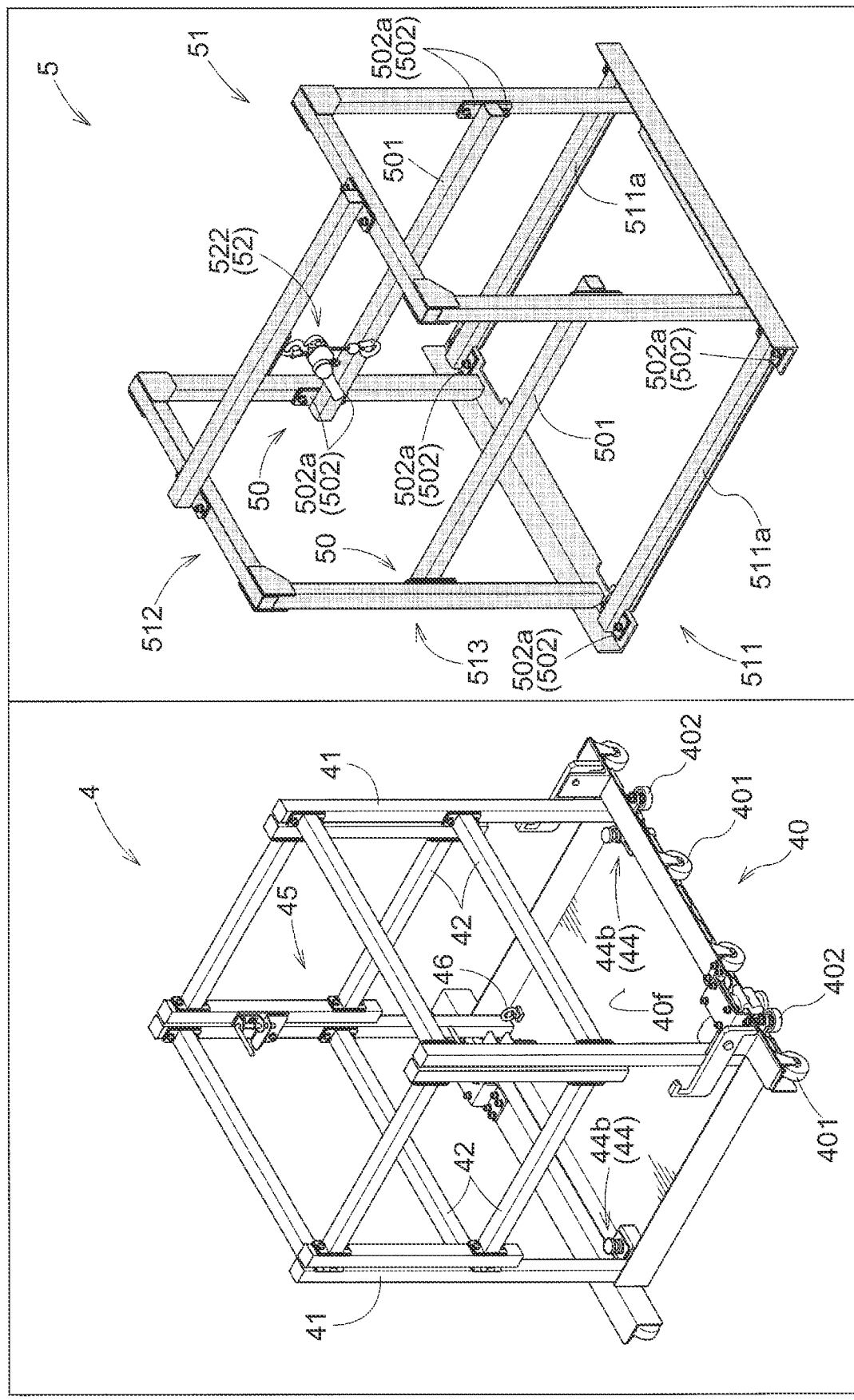
FIG. 3 is a perspective view of an operation vehicle and a holding device.

As shown in FIG. 3, the article storage facility 100 includes an operation vehicle 4 and a holding device 5. The operation vehicle 4 travels and carries the operator along the travel paths R (the first travel path R1 and the third travel path R3) along which the transport vehicle 1 (first transport vehicle 1) travels. The holding device 5 includes a holder 50 that holds the operation vehicle 4 and an elevator 52 that lifts and lowers the operation vehicle 4. The operator on the operation vehicle 4 can move to the operation area.

The operation vehicle 4 travels along the first travel path R1 and the third travel path R3, similarly to the first transport vehicle 1. In other words, the first travel path R1 and the third travel path R3 each include rails (the first rails R1a and the third rails R3a) on which the operation vehicle 4 travels.

In the present embodiment, the operation vehicle 4 includes a vehicle body 40 including wheels 401 for traveling along the travel paths R (the first travel path R1 and the third travel path R3), multiple posts 41 extending from the vehicle body 40, and multiple lateral bars 42 each connecting the adjacent posts 41. The operation vehicle 4 travels with the wheels 401 rolling. The operation vehicle 4 includes guide rollers 402 for stably traveling, and a brake for stopping rotation of the wheels 401. The posts 41 and the lateral bars 42 define the main structure of the operation vehicle 4. The operation vehicle 4 may include any number of posts 41 and lateral bars 42 at any positions determined as appropriate for, for example, the use or capacity of the operation vehicle 4.

The vehicle body 40 has a boarding surface 40f for receiving the operator. The posts 41 and the lateral bars 42 surround the boarding surface 40f when viewed from above or below. In the illustrated example, the structure including the posts 41 and the lateral bars 42 includes a door 45 operable to be open and closed. The operator can step on and out of the boarding surface through the door 45.

As described above, the operation vehicle 4 carries the operator to the operation area to perform an operation in the article storage S. During normal operation without using the operation vehicle 4, the operation vehicle 4 is kept in a vehicle storage 7 (refer to FIG. 1) outside the article storage S. The operation vehicle 4 is transported from the vehicle storage 7 to an intended area (to which the operation vehicle 4 can travel) as appropriate. However, the operation vehicle 4 is susceptible to inertia or vibration during transport and tends to decrease its stability. The article storage facility 100 according to an aspect of the present disclosure transports the operation vehicle 4 held by the holding device 5 to the intended area.

As described above, the holding device 5 includes the holder 50 that holds the operation vehicle 4. The holding device 5 has substantially the same bottom dimensions as each article 9. In the present embodiment, the holding device 5 has substantially the same bottom dimension as each article 9 at least in the second direction Y. For the articles 9 including pallets and loads placed on the pallets, for example, the holding device 5 has substantially the same bottom dimensions as each pallet. For the holding device 5 with substantially the same bottom dimensions as each article 9, the transport system for transporting the article 9 can also be used to transport the holding device 5 holding the operation vehicle 4. This allows transport of the operation vehicle 4 being held stably to the intended area.

In the present embodiment, the holding device 5 includes a frame 51 to surround the operation vehicle 4 to be held.

In the present embodiment, the frame 51 includes a lower frame 511, an upper frame 512 located above the lower frame 511, and a connection frame 513 connecting the lower frame 511 and the upper frame 512. These frames define the main structure of the holding device 5. In this example, the lower frame 511 has substantially the same external dimensions as each article 9 when viewed from above or below. Thus, the transport system for transporting the article 9 can also be used to support the lower frame 511 instead of the article 9. Each frame may include any number of components at any positions determined as appropriate for, for example, the use or capacity of the holding device 5.

Figure 4:
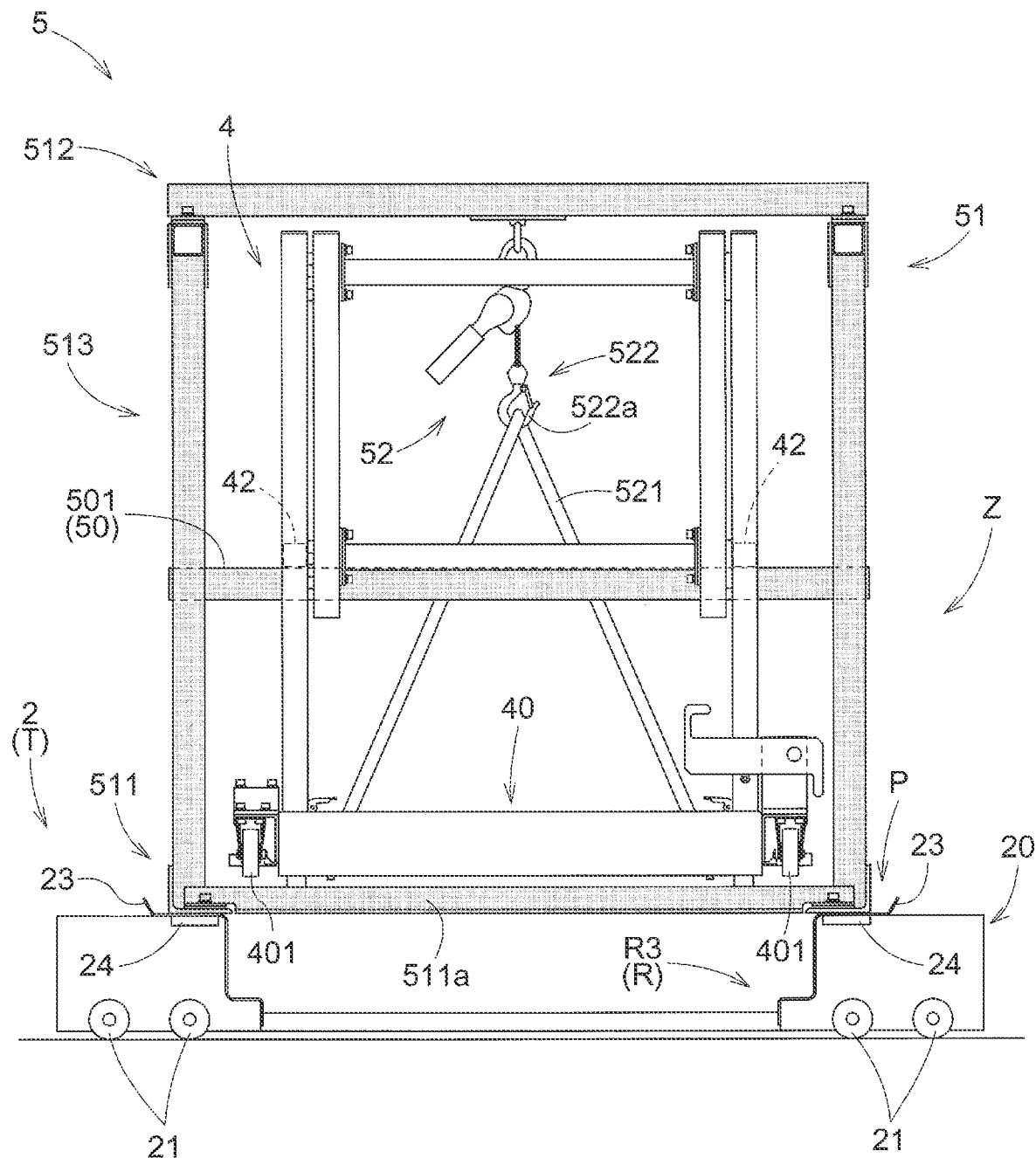
FIG. 4 is a view of a holder in a holding state when viewed in a first direction.
Figure 5:
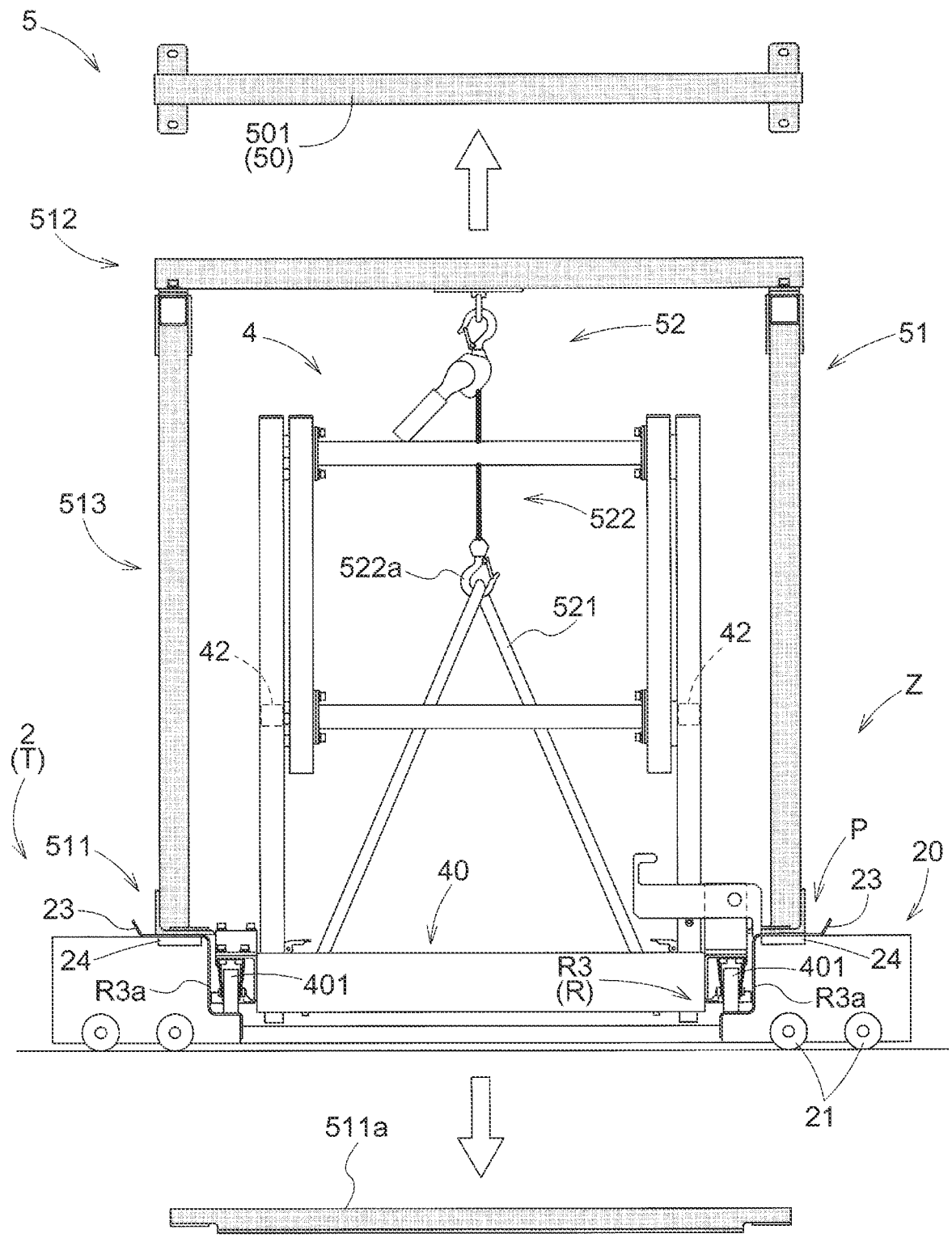
FIG. 5 is a view of the holder in a non-holding state when viewed in the first direction.

As shown in FIGS. 4 and 5, the holder 50 has the state changeable between a holding state in which the holder 50 holds the operation vehicle 4 and a non-holding state in which the holder 50 does not hold the operation vehicle 4. In the holding state, the holder 50 holds the operation vehicle 4 not to separate from the holding device 5. In the holding state, the holder 50 holds the operation vehicle 4 on at least one of its upper, lower, front, rear, left, or right portion. FIG. 4 shows the holder 50 in the holding state. FIG. 5 shows the holder 50 in the non-holding state.

As shown in FIG. 3, the holder 50 in the present embodiment includes supports 501 and state changers 502. The supports 501 are attached to the frame 51. The state changers 502 are used to change the state of the holder 50 between the holding state and the non-holding state.

As shown in FIG. 4, in the holding state of the holder 50, the supports 501 intersect with the lifting-lowering area of the operation vehicle 4 and support the operation vehicle 4 from below. In the present embodiment, in the holding state of the holder 50, the supports 501 support the lateral bars 42 in the operation vehicle 4 from below. This holds the operation vehicle 4.

In the present embodiment, the supports 501 are detachably attached to the frame 51 with fasteners 502a (refer to FIG. 3) included in the state changers 502 at positions to support, from below, the lateral bars 42 in the operation vehicle 4 to be held. The supports 501 extend in the horizontal direction. In this example, the supports 501 are detachably attached to the connection frame 513. The fasteners 502a may be any known components, such as bolts or pins.

In the present embodiment, the holder 50 includes auxiliary supports 511a in addition to the supports 501. The auxiliary supports 511a assist the supports 501 supporting the operation vehicle 4.

In the holding state of the holder 50, the auxiliary supports 511a intersect with the lifting-lowering area of the operation vehicle 4. In this example, the auxiliary supports 511a are located below and spaced from the supports 501. With the supports 501 supporting the lateral bars 42 in the operation vehicle 4, the auxiliary supports 511a are located below and spaced from the lateral bars 42 and thus are not in contact with the operation vehicle 4. The auxiliary supports 511a support the operation vehicle 4 in an auxiliary manner to avoid the operation vehicle 4 falling off the holding device 5 when the supports 501 fail to support the operation vehicle 4. Thus, the auxiliary supports 511a can prevent the operation vehicle 4 from falling off. In this example, the auxiliary supports 511a are parts of the lower frame 511.

In the present embodiment, the auxiliary supports 511a are detachably attached to the frame 51 with the fasteners 502a (refer to FIG. 3) included in the state changers 502. The auxiliary supports 511a extend in the horizontal direction. In this example, the auxiliary supports 511a are detachably attached to components included in the lower frame 511 other than the auxiliary supports 511a.

In the present embodiment, the elevator 52 includes a connector 521 connectable to the operation vehicle 4, and a lifter 522 attached to the frame 51. The lifter 522 lifts the connector 521 to lift the operation vehicle 4 connected to the connector 521.

In the present embodiment, the lifter 522 includes a hook 522a attached to the upper frame 512. For example, the lifter 522 includes a lever hoist that winds up and down the connector 521 in response to an operation on the lever.

In the present embodiment, the operation vehicle 4 includes a fixing member 46 for fixing the connector 521 (refer to FIG. 3). In this example, the operation vehicle 4 includes multiple fixing members 46 on the outer edge of the boarding surface 40f. FIG. 3 shows one of the fixing members 46 and does not show the other fixing members 46 hidden behind other components.

As shown in FIGS. 4 and 5, the connector 521 is fixed to the fixing members 46 and is thus connected to the operation vehicle 4. The connector 521 includes, for example, a rope, a wire, or a chain. The fixing members 46 include, for example, shackles. In this example, the connector 521 fixed to the fixing members 46 in the operation vehicle 4 is hooked on the hook 522a in the lifter 522. The connector 521 is lifted by the lifter 522 to lift the operation vehicle 4, and is lowered by the lifter 522 to lower the operation vehicle 4. The area through which the operation vehicle 4 is lifted and lowered by the elevator 52 is also simply referred to as a lifting-lowering area of the operation vehicle 4.

To change the state of the holder 50 to the non-holding state, the state changers 502 are operated to remove the supports 501 out of the lifting-lowering area of the operation vehicle 4 when the operation vehicle 4 is lifted by the elevator 52 and located above and spaced from the supports 501 (refer to FIG. 5). More specifically, to change the state of the holder 50 from the holding state to the non-holding state, the state changers 502 are operated to remove the supports 501 from the frame 51 when the operation vehicle 4 is lifted by the elevator 52 and has the lateral bars 42 located above and spaced from the supports 501. To change the state of the holder 50 from the non-holding state to the holding state, the state changers 502 are operated to attach the supports 501 to the frame 51 at positions below and spaced from the lateral bars 42 in the operation vehicle 4 lifted by the elevator 52. The operation vehicle 4 is then lowered by the elevator 52 to have the lateral bars 42 in contact with the supports 501 from above and supported on the supports 501. The state of the holder 50 is thus changed to the holding state (refer to FIG. 4).

The holding device 5, with the holder 50 holding the operation vehicle 4, is transported from the loader (loading conveyor 81) by the transporter T (refer to FIG. 1). The holding device 5 is then placed on mounts P located along the travel path R. As shown in FIG. 2, the mounts P in the present embodiment are located on the second transport vehicle 2. The holding device 5 holding the operation vehicle 4 is placed on the mounts P. In the present embodiment, the article mounts 24 on the second transport vehicle 2 serve as the mounts P. In this example, the second transport vehicle 2 includes a pair of article mounts 24 as the mounts P located across the vehicle placement portion 22 in the second direction Y. The holding device 5 is placed on the pair of mounts P corresponding to the pair of article mounts 24.

As shown in FIG. 1, in the present embodiment, the holding device 5 holding the operation vehicle 4 is transported from the vehicle storage 7 to the loading conveyor 81 to perform any operation in the operation area. The holding device 5 is then transported by the lifting device TMa to the shelve in the article storage S corresponding to the operation area, and is delivered to the relay conveyor TMb on the shelf. The holding device 5 is then delivered to the second transport vehicle 2 by the relay conveyor TMb. Thus, the holding device 5 holding the operation vehicle 4 is placed on the mounts P on the second transport vehicle 2. In the present embodiment, the conveyor including the article mounts 24 on the second transport vehicle 2 is operated to load and unload the holding device 5 to and from the second transport vehicle 2 (specifically, the mounts P). In the example shown in FIG. 1, the holding device 5 is transported from the vehicle storage 7 to the loading conveyor 81 using an unmanned transport vehicle 6. In some embodiments, the holding device 5 may be transported from the vehicle storage 7 to the loading conveyor 81 using any transporter other than the unmanned transport vehicle, such as a forklift or a conveyor.

The second transport vehicle 2 then travels along the second travel path R2 with the holding device 5 placed on the mounts P on the second transport vehicle 2. The second transport vehicle 2 stops at a position adjacent to the first travel path R1 corresponding to the operation area. This causes the third travel path R3 on the second transport vehicle 2 to be continuous, in the first direction X, with the first travel path R1 corresponding to the operation area. The position at which the third travel path R3 is continuous with the first travel path R1 on the second travel path R2 is hereafter referred to as a corresponding position Z (refer to FIG. 2). In other words, the corresponding position Z is the position at which the extending direction of the first travel path R1 intersects with the extending direction of the second travel path R2. The operator does not board the operation vehicle 4 while the operation vehicle 4 held by the holding device 5 is being transported to the corresponding position Z.

FIGS. 4 and 5 each show the second transport vehicle 2 at the corresponding position Z.

As shown in FIG. 4, when the second transport vehicle 2 is at the corresponding position Z, the holding device 5 is placed on the mounts P on the second transport vehicle 2 and the operation vehicle 4 is held by the holding device 5. In this state, the holder 50 is in the holding state.

As shown in FIG. 5, the state of the holder 50 in the holding device 5 placed on the mounts P is changed to the non-holding state and the elevator 52 lowers the operation vehicle 4 to place the operation vehicle 4 on the travel path R. When the supports 501 are out of the lifting-lowering area of the operation vehicle 4, the elevator 52 lowers the operation vehicle 4 to the position at which the operation vehicle 4 is placed on the travel path R. The operation vehicle 4 may be placed on the travel path R at a position other than the corresponding position Z (e.g., at the position at which the holding device 5 is loaded onto the second transport vehicle 2).

In the present embodiment, the supports 501 and the auxiliary supports 511a are removed from the frame 51 when the operation vehicle 4 is lifted by the elevator 52 and has the lateral bars 42 located above and spaced from the supports 501. The operation vehicle 4 is then lowered by the elevator 52 and placed on the travel path R. In this example, the operation vehicle 4 is placed on the third travel path R3 on the second transport vehicle 2. In other words, the elevator 52 in the holding device 5 placed on the mounts P lowers the operation vehicle 4 to place the operation vehicle 4 on the third travel path R3. When the second transport vehicle 2 is at the corresponding position Z, the third travel path R3 is continuous with the first travel path R1 (refer to FIG. 2). The operation vehicle 4 placed on the third travel path R3 can thus travel along the third travel path R3 and enter the first travel path R1. In this example, the operation of the elevator 52 and the removal of the supports 501 and the auxiliary supports 511a are performed by the operator.

Figure 7A:
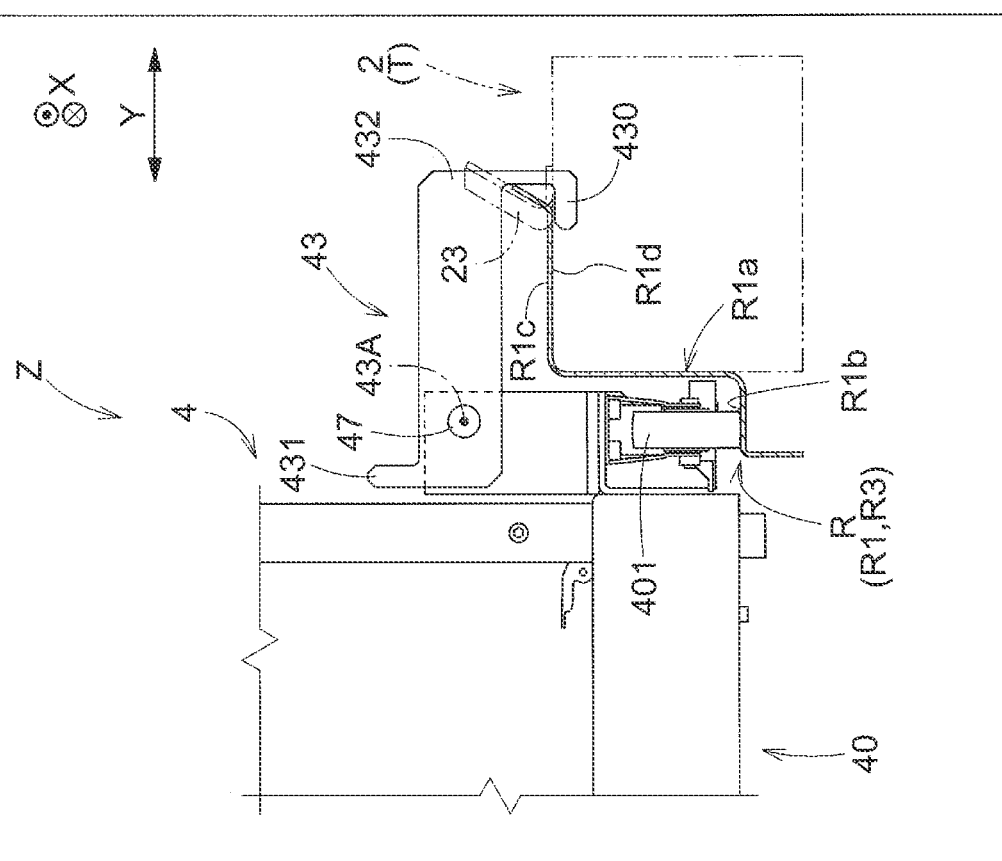
FIG. 7A is a cross-sectional view of the switcher in a non-facing state taken along line VII-VII in FIG. 6.
Figure 7B:
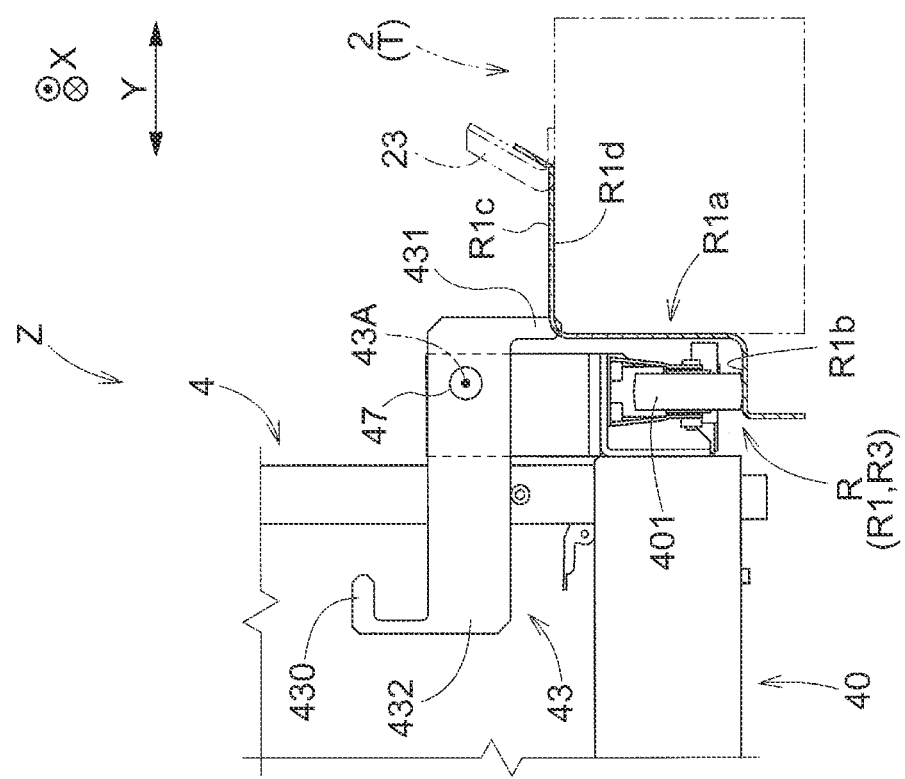
FIG. 7B is a cross-sectional view of the switcher in a facing state taken along line VII-VII in FIG. 6.

FIG. 6 shows the boundary between the first travel path R1 and the third travel path R3 at the corresponding position Z. FIGS. 7A and 7B are each a cross-sectional view taken along line VII-VII in FIG. 6. In other words, FIGS. 7A and 7B are each a view of the structure when viewed in the travel direction, or in the path extending direction X, along the travel path R (the first travel path R1 and the third travel path R3).

As shown in FIGS. 6, 7A, and 7B, the operation vehicle 4 in the present embodiment includes a switcher 43. The switcher 43 is switchable between a facing state in which the switcher 43 faces a lower surface R1d of the first rail R1a from below with a clearance between them (refer to FIG. 7B) and a non-facing state in which the switcher 43 does not face the lower surface R1d of the first rail R1a (refer to FIG. 7A) when viewed in the travel direction along the travel path R.

In the present embodiment, the switcher 43 is rotatably connected to the vehicle body 40. In this example, the switcher 43 is connected to the vehicle body 40 with a pin 47 extending in the path extending direction X. The switcher 43 is thus rotatable about an axis 43A extending in the path extending direction X. In the present embodiment, the switcher 43 is switchable between the facing state and the non-facing state when being rotated about the axis 43A extending in the path extending direction X relative to the vehicle body 40.

As shown in FIGS. 7A and 7B, each first rail R1a in the present embodiment has a traveling surface R1b on which the first transport vehicle 1 or the operation vehicle 4 travels, and an article support surface R1c located above the traveling surface R1b to support the article 9. The traveling surface R1b is located inward from the article support surface R1c in the path width direction Y. The article support surface R1c is located above the traveling surface R1b and outward from the traveling surface R1b in the path width direction Y.

In the present embodiment, the switcher 43 in the facing state faces, from below, the surface of the first rail R1a opposite to the article support surface R1c. In this example, the surface of the first rail R1a opposite to the article support surface R1c corresponds to the lower surface of the rail.

In the present embodiment, in the facing state (refer to FIG. 7B), the switcher 43 comes in contact with the lower surface R1d of the first rail R1a to restrict falling of the operation vehicle 4 on the first travel path R1 in the path extending direction X. In this example, the switcher 43 is located at each of the two ends of the operation vehicle 4 in the path extending direction X. More specifically, the switcher 43 is located at each of the front and rear ends of the operation vehicle 4 in the travel direction.

In the facing state, the switcher 43 at the front end of the operation vehicle 4 comes in contact with the lower surface R1d of the first rail R1a from below when the operation vehicle 4 is about to fall backward with the front wheels 401 off the first rail R1a (referred to as backward falling). This can effectively restrict backward falling of the operation vehicle 4.

In the facing state, the switcher 43 at the rear end of the operation vehicle 4 comes in contact with the lower surface R1d of the first rail R1a from below when the operation vehicle 4 is about to fall forward with the rear wheels 401 off the first rail R1a (referred to as forward falling). This can effectively restrict forward falling of the operation vehicle 4.

As shown in FIG. 6, the second transport vehicle 2 stopped at the corresponding position Z defines a clearance G between the first travel path R1 and the third travel path R3 in the first direction X. In the present embodiment, the switcher 43 is switchable between the facing state and the non-facing state at the clearance G. This allows the switcher 43 to switch between the facing state and the non-facing state without coming in contact with the first rail R1a on the first travel path R1 and the third rail R3a on the third travel path R3.

In the present embodiment, the switcher 43 in the non-facing state (refer to FIG. 7A) restricts transfer of the operation vehicle 4 from the third travel path R3 to the first travel path R1. In other words, in FIG. 7A, the switcher 43 restricts the operation vehicle 4 from moving in the direction from the page of the figure. In the facing state (refer to FIG. 7B), the switcher 43 restricts transfer of the operation vehicle 4 from the first travel path R1 to the third travel path R3. In other words, in FIG. 7B, the switcher 43 restricts the operation vehicle 4 from moving in the direction into the page of the figure.

As shown in FIG. 7A, in the non-facing state, the switcher 43 overlaps the first rail R1a and does not overlap the second transport vehicle 2 when viewed in the path extending direction X. In the non-facing state of the switcher 43, the operation vehicle 4 can travel along the third travel path R3 on the second transport vehicle 2 but cannot travel along the first travel path R1 including the first rail R1a. Thus, the switcher 43 in the non-facing state restricts transfer of the operation vehicle 4 from the third travel path R3 to the first travel path R1.

To transfer the operation vehicle 4 from the third travel path R3 to the first travel path R1 with this structure, the switcher 43 is to be switched to the facing state to restrict falling of the operation vehicle 4. In other words, the operation vehicle 4 cannot travel along the first travel path R1 with the switcher 43 being in the non-facing state. The operation vehicle 4 can thus avoid falling on the first travel path R1 and increase the operator safety.

As shown in FIG. 7B, in the facing state, the switcher 43 overlaps the second transport vehicle 2 and does not overlap the first rail R1a when viewed in the path extending direction X. In the facing state of the switcher 43, the operation vehicle 4 can travel along the first travel path R1 including the first rail R1a but cannot travel along the third travel path R3 on the second transport vehicle 2. Thus, the switcher 43 in the facing state restricts transfer of the operation vehicle 4 from the first travel path R1 to the third travel path R3.

To transfer the operation vehicle 4 from the first travel path R1 to the third travel path R3 with this structure, the switcher 43 is to be switched to the non-facing state. In other words, the operation vehicle 4 cannot travel along the third travel path R3 with the switcher 43 being in the facing state. The operator can thus remember to return the switcher 43 from the facing state to the non-facing state.

As shown in FIGS. 7A and 7B, in the present embodiment, the switcher 43 includes a rail-facing portion 430, a first overlap portion 431, and a second overlap portion 432.

In the facing state of the switcher 43 (refer to FIG. 7B), the rail-facing portion 430 faces the lower surface R1d of the first rail R1a from below. In this example, the switcher 43 in the facing state covers an outer portion of the first rail R1a in the path width direction Y from above, from outside in the path width direction Y, and from below. The rail-facing portion 430 is included in the portion of the switcher 43 covering such an outer portion of the first rail R1a.

In the non-facing state of the switcher 43 (refer to FIG. 7A), the first overlap portion 431 overlaps the first rail R1a when viewed in the path extending direction X. In the facing state of the switcher 43 (refer to FIG. 7B), the first overlap portion 431 does not overlap the first rail R1a or the second transport vehicle 2 when viewed in the path extending direction X.

In the facing state of the switcher 43 (refer to FIG. 7B), the second overlap portion 432 overlaps the second transport vehicle 2 when viewed in the path extending direction X. In this example, the second transport vehicle 2 includes a positioner 23 for positioning the article 9 in the horizontal direction (the second direction Y in this example) to place the article 9 onto the second transport vehicle 2. In the facing state of the switcher 43, the second overlap portion 432 overlaps the positioner 23 in the second transport vehicle 2 when viewed in the path extending direction X. In the non-facing state of the switcher 43 (refer to FIG. 7A), the second overlap portion 432 does not overlap the first rail R1a or the second transport vehicle 2 when viewed in the path extending direction X.

Figure 8:
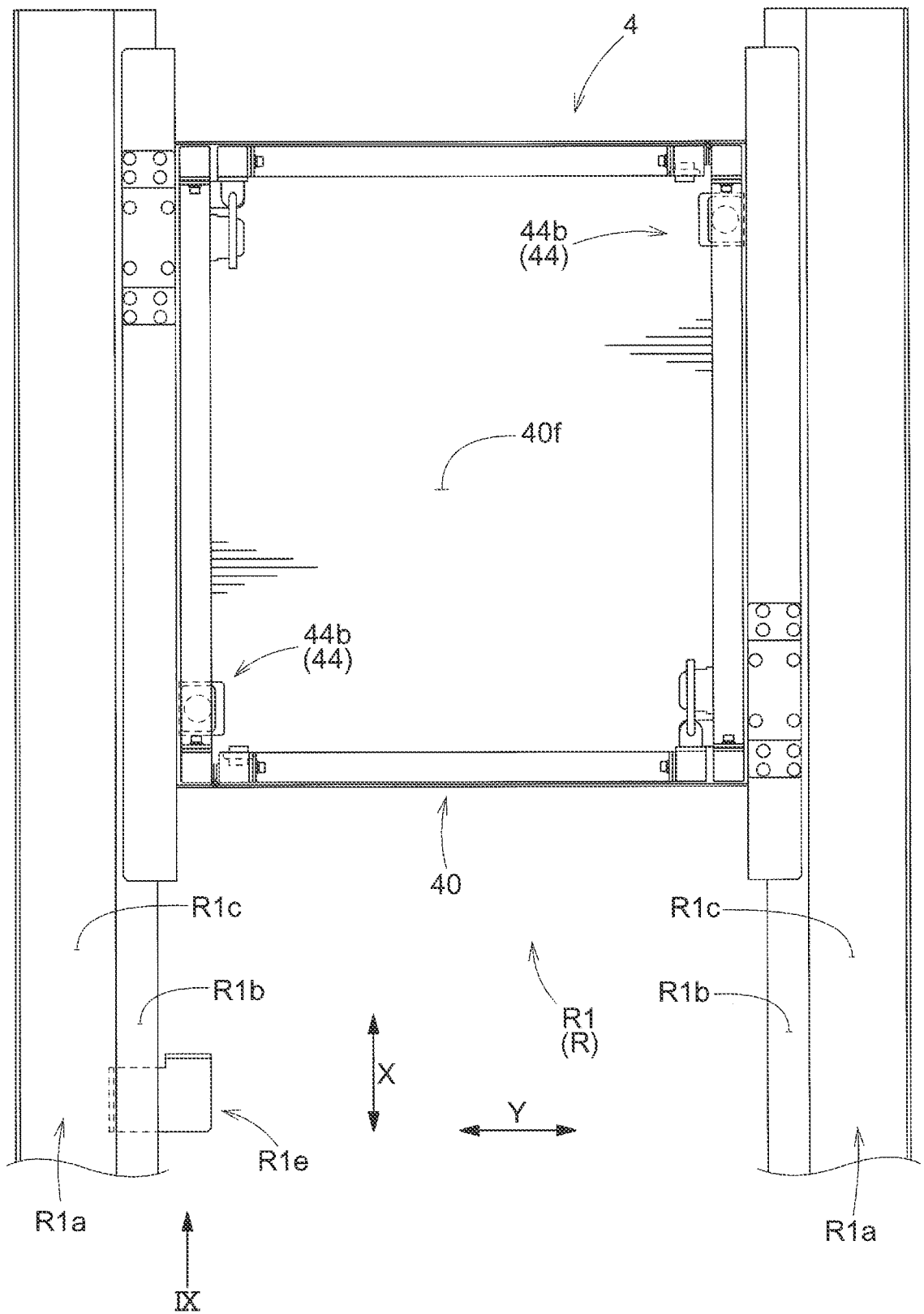
FIG. 8 is a plan view of a travel restrictor.
Figure 9:
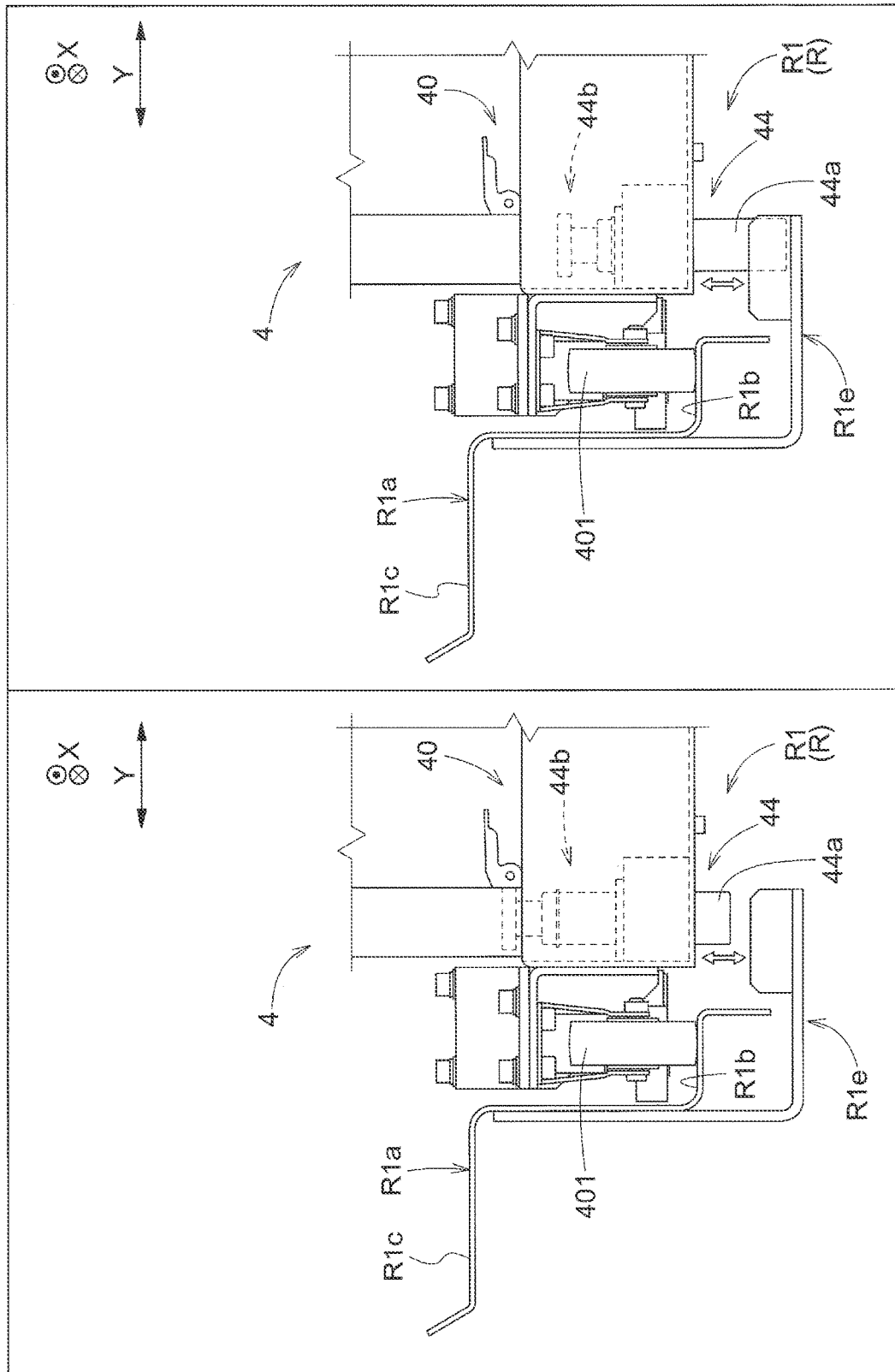
FIG. 9A is a view of a stopper in a non-overlapping state when viewed in the direction indicated by arrow IX in FIG. 8.
FIG. 9B is a view of the stopper in an overlapping state when viewed in the direction indicated by arrow IX in FIG. 8.

FIG. 8 is a view of the first travel path R1, showing a portion adjacent to its terminal end. The terminal end of the first travel path R1 is opposite to the start end of the first travel path R1 in the path extending direction X. In other words, the terminal end of the first travel path R1 is opposite to the end adjacent to the second travel path R2 in the path extending direction X. FIGS. 9A and 9B are each a view of the structure when viewed in the direction indicated by arrow IX in FIG. 8.

In the present embodiment, the travel path R includes a travel restrictor R1e at an end to restrict travel of the operation vehicle 4. The travel restrictor R1e is located adjacent to the terminal end of the first travel path R1. The travel restrictor R1e is attached to the first rail R1a. The travel restrictor R1e protrudes downward from the first rail R1a.

As shown in FIGS. 9A and 9B, the operation vehicle 4 in the present embodiment includes stoppers 44. Each stopper 44 has the state changeable between an overlapping state in which the stopper 44 overlaps the travel restrictor R1e (refer to FIG. 9B) and a non-overlapping state in which the stopper 44 does not overlap the travel restrictor R1e (refer to FIG. 9A) when viewed in the travel direction along the travel path R (path extending direction X).

In the present embodiment, the stopper 44 is connected to the vehicle body 40 to be extended and retracted vertically relative to the vehicle body 40. In this example, the stopper 44 includes a protrusion 44a protruding downward from the vehicle body 40, and an operable portion 44b operable to change the degree by which the protrusion 44a protrudes. Each operable portion 44b is located on the boarding surface 40f of the vehicle body 40 (refer also to FIG. 3) and is operable by the operator on the boarding surface 40f.

In response to the operable portion 44b being operated to cause the protrusion 44a to protrude by a degree to overlap the travel restrictor R1e when viewed in the path extending direction X, the stopper 44 is switched to the overlapping state (refer to FIG. 9B). In the overlapping state (refer to FIG. 9B), the stopper 44 is in contact with the travel restrictor R1e and restricts travel of the operation vehicle 4. In response to the operable portion 44b being operated to cause the protrusion 44a to protrude by a degree not to overlap the travel restrictor R1e when viewed in the path extending direction X, the stopper 44 is switched to the non-overlapping state (refer to FIG. 9A).

Second Embodiment

An article storage facility 200 according to a second embodiment will now be described with reference to FIGS. 10 and 11. The present embodiment differs from the first embodiment in the schematic structure of the facility. The second embodiment will be described focusing on the differences from the first embodiment. The components that are the same as or similar to those in the first embodiment will not be described.

Figure 10:
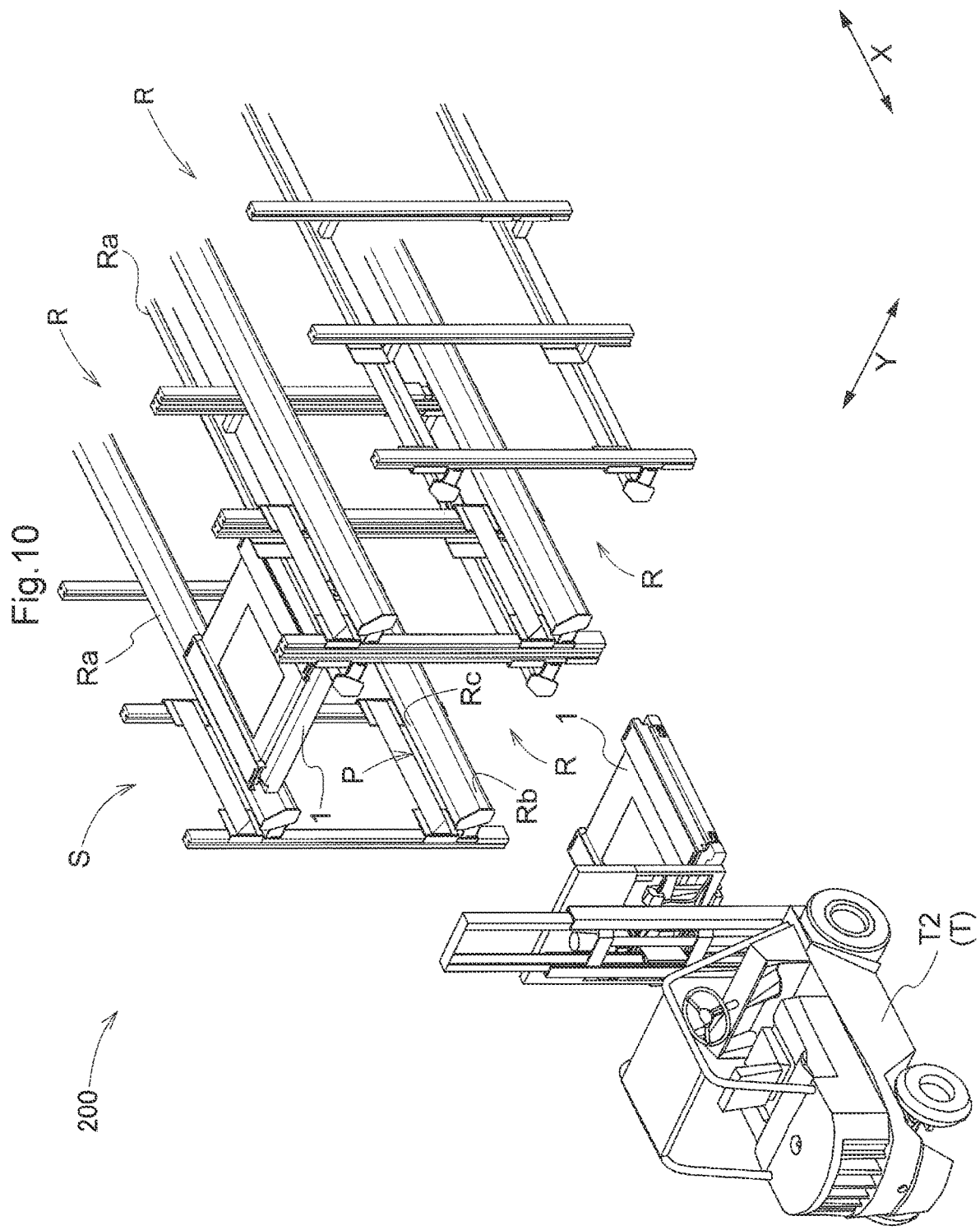
FIG. 10 is a perspective view of an article storage facility according to a second embodiment.

As shown in FIG. 10, the article storage facility 200 according to the present embodiment includes an article storage S including multiple travel paths R, a transport vehicle 1, and a forklift T2 as the transporter T. The article storage S stores articles (not shown) on the travel paths R.

The transport vehicle 1 transports articles. The forklift T2 transports the transport vehicle 1.

Although not illustrated in detail, an article is transported from a loader by the transporter (e.g., a conveyor) onto the transport vehicle 1. The transport vehicle 1 is then transported by the forklift T2 to the travel path R in the article storage S. The transport vehicle 1 with the article travels along the travel path R and transports the article to a storage position on the travel path R. The article is thus loaded into the article storage S. To unload the article from the article storage S, the above operations are performed in the reverse order by the devices.

The article storage S includes a pair of rails Ra defining the travel path R. Each of the pair of rails Ra has a traveling surface Rb on which the transport vehicle 1 travels, and an article support surface Rc located above the traveling surface Rb to support an article.

The traveling surfaces Rb extend in the path extending direction X in which the travel path R extends. The article support surfaces Rc extend in the path extending direction X to support multiple articles (not shown) arranged in the path extending direction X.

The article storage facility 200 with this structure includes the operation vehicle 4 and the holding device 5 described in the first embodiment.

Figure 11:
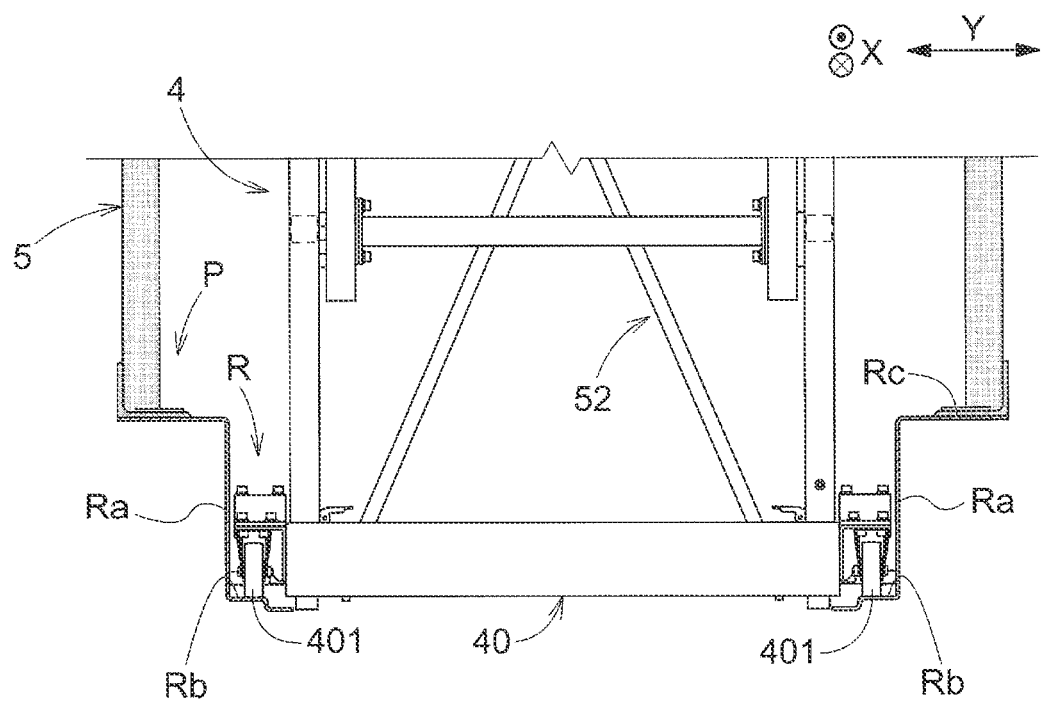
FIG. 11 is a view of an operation vehicle placed on a travel path in the second embodiment, when viewed in a path extending direction.

As shown in FIGS. 10 and 11, each of the pair of rails Ra in the present embodiment includes a mount P on the article support surface Rc to receive the holding device 5. In the present embodiment, the holding device 5 holding the operation vehicle 4 is transported by the forklift T2 onto the mounts P.

As shown in FIG. 11, the elevator 52 in the holding device 5 placed on the mounts P lowers the operation vehicle 4 to place the operation vehicle 4 on the traveling surfaces Rb. This allows the operation vehicle 4 to travel along the traveling surfaces Rb. The operator on the operation vehicle 4 can move along the travel path R to an operation area. In the present embodiment, the holding device 5 holds and releases the operation vehicle 4 using processes that are the same as or similar to those in the first embodiment.

Other Embodiments

An article storage facility according to other embodiments will now be described.

Figure 12:
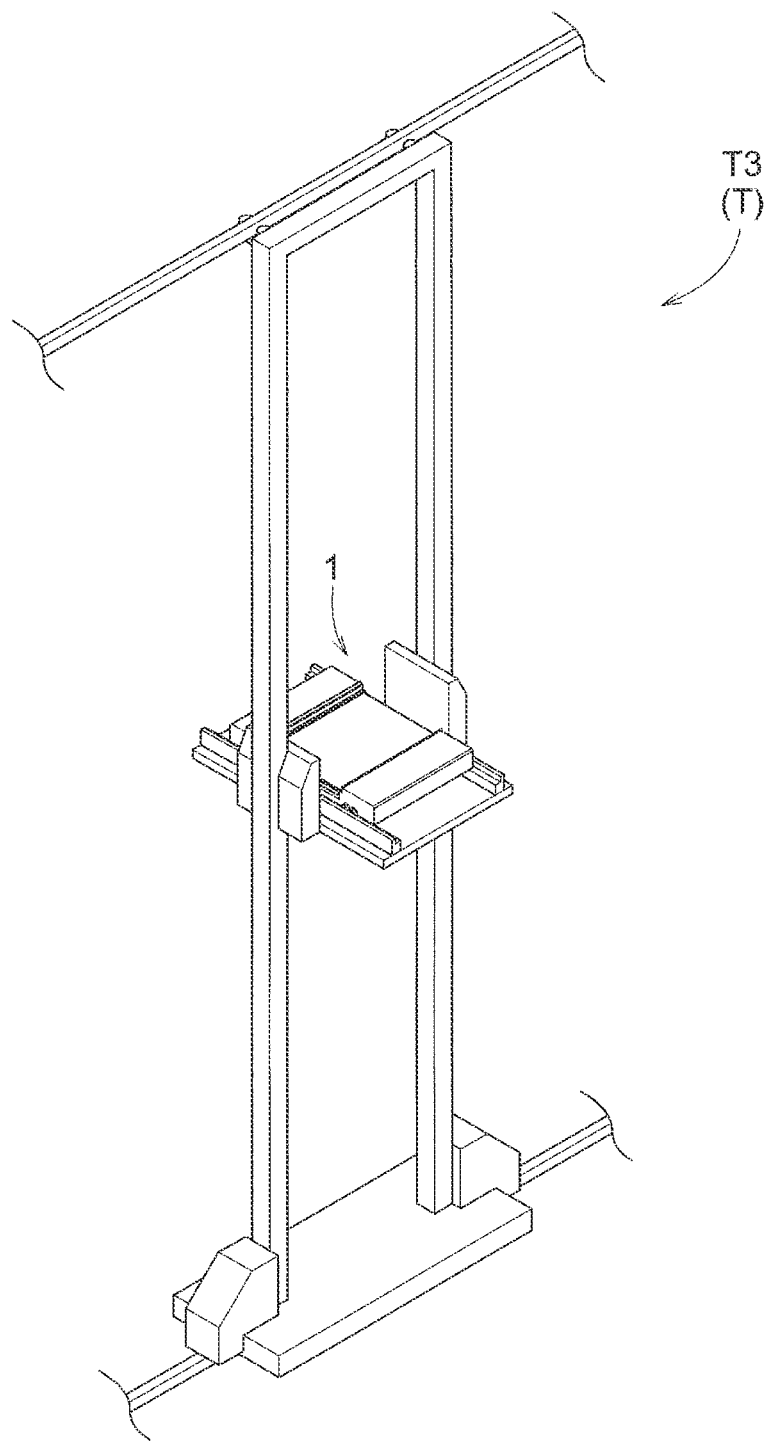
FIG. 12 is a perspective view of a transporter in another embodiment.

(1) In the second embodiment, the forklift T2 for transporting the transport vehicle 1 is used to transport the holding device 5 holding the operation vehicle 4 (refer to FIG. 10). In some embodiments, as shown in FIG. 12, for example, a stacker crane T3 (transporter T) for transporting the transport vehicle 1 may be used to transport the holding device 5 holding the operation vehicle 4.

(2) In the above embodiments, the lifter 522 lifts the connector 521 to lift the operation vehicle 4 connected to the connector 521. In some embodiments, the lifter 522 may directly lift the operation vehicle 4 without using the connector 521. In this case, the elevator 52 may not include the connector 521.

(3) In the above embodiments, the lifter 522 includes the lever hoist. In some embodiments, the lifter 522 may include any known component that can lift the operation vehicle 4, such as a jack or a pulley.

(4) In the above embodiments, in the holding state of the holder 50, the supports 501 support the lateral bars 42 in the operation vehicle 4 from below. In some embodiments, the supports 501 may support a portion of the operation vehicle 4 other than the lateral bars 42. For example, the supports 501 may support the vehicle body 40 of the operation vehicle 4. In some embodiments, the supports 501 may support the operation vehicle 4 using dedicated support components included in the operation vehicle 4.

(5) In the above embodiments, the holder 50 and the elevator 52 are separate devices. In some embodiments, the holder 50 and the elevator 52 may use a common component. For example, the holder 50 and the elevator 52 may include a common holding unit (for holding the operation vehicle 4). In this case, the elevator 52 lifts and lowers the operation vehicle 4 held by the common holding unit, or in other words, held by the holder 50. For example, the common holding unit suspends the operation vehicle 4 similarly to the hook 522a in the above embodiments.

(6) In the above embodiments, the switcher 43 switches between the facing state and the non-facing state when being rotated relative to the vehicle body 40. In some embodiments, the switcher 43 may switch between the facing state and the non-facing state when, for example, being moved linearly rather than rotated.

(7) In the above embodiments, the state of the stopper 44 is changed between the overlapping state and the non-overlapping state when the stopper 44 is extended and retracted vertically relative to the vehicle body 40. In some embodiments, the state of the stopper 44 may be changed between the overlapping state and the non-overlapping state when, for example, the stopper 44 is moved linearly in the horizontal direction or in a nonlinear manner, such as being rotated.

(8) The structure described in each of the above embodiments may be combined with any other structures described in the other embodiments unless any contradiction arises. The embodiments described herein are merely illustrative in all respects and may be modified variously as appropriate without departing from the spirit and scope of the present disclosure.

Overview of Embodiments

Hereafter, the article storage facility will be described.

An article storage facility includes a transport vehicle that travels along a travel path to transport an article, an article storage that stores the article transported by the transport vehicle, a transporter that transports the article from a loader to the transport vehicle, an operation vehicle that travels and carries an operator along the travel path along which the transport vehicle travels, and a holding device including a holder that holds the operation vehicle and an elevator that lifts and lowers the operation vehicle. The holder has a state changeable between a holding state in which the holder holds the operation vehicle and a non-holding state in which the holder does not hold the operation vehicle. The holding device with the holder holding the operation vehicle is transported by the transporter from the loader and is placed on a mount located along the travel path. The state of the holder in the holding device placed on the mount is changed to the non-holding state and the elevator lowers the operation vehicle to place the operation vehicle on the travel path.

With this structure, the transporter can transport the operation vehicle held by the holding device. The operation vehicle is thus held more stably than when directly supported on the transporter during transport. When the transporter places the holding device on the mount located along the travel path, the operation vehicle held by the holding device is at the position corresponding to the travel path. In this state, the state of the holder is changed to the non-holding state and the elevator lowers the operation vehicle to place the operation vehicle on the travel path. This completes placement of the operation vehicle in the operation area. The above structure thus allows easy transport of the operation vehicle to the operation area.

The holder may include a support and a state changer. In the holding state of the holder, the support may intersect with a lifting-lowering area through which the operation vehicle is lifted and lowered, and support the operation vehicle from below. When the operation vehicle is lifted by the elevator and located above and spaced from the support, the state changer may be operable to remove the support out of the lifting-lowering area and change the state of the holder to the non-holding state. When the support is out of the lifting-lowering area, the elevator may lower the operation vehicle to a position at which the operation vehicle is placed on the travel path.

With this structure, the operation vehicle can be held stably by the holder when being transported by the transporter. The state changer is operable to remove the support out of the lifting-lowering area of the operation vehicle and change the state of the holder to the non-holding state. This can easily change the state of the holder to the non-holding state, and allows the operation vehicle to separate from the holding device to be placed on the travel path without coming in contact with the support. The above structure also allows easy operations such as holding and releasing the operation vehicle using the elevator to lift and lower the operation vehicle.

The operation vehicle may include a vehicle body including a wheel to travel along the travel path, a plurality of posts extending from the vehicle body, and a lateral bar connecting adjacent posts of the plurality of posts. The holding device may include a frame that surrounds the operation vehicle to be held. The support may be detachably attached to the frame with a fastener included in the state changer at a position to support, from below, the lateral bar in the operation vehicle to be held. The elevator may include a connector connectable to the operation vehicle, and a lifter attached to the frame. The lifter may lift the connector to lift the operation vehicle connected to the connector.

Thus, the operation vehicle and the holding device that holds the operation vehicle have relatively simple structures.

The article storage may include a plurality of first travel paths included in the travel path along which a first transport vehicle being the transport vehicle travels, and a second travel path extending in a direction intersecting with the plurality of first travel paths when viewed from above or below. The transporter may include a second transport vehicle that travels along the second travel path, and an intermediate transport assembly that transports the article from the loader to the second transport vehicle. The second transport vehicle may include a vehicle placement portion on which the first transport vehicle is placeable, and a third travel path included in the travel path and located on the vehicle placement portion. The mount may be included in the second transport vehicle. The elevator in the holding device placed on the mount may lower the operation vehicle to place the operation vehicle on the third travel path.

The article storage facility with this structure includes the first transport vehicle and the second transport vehicle for carrying the first transport vehicle. In this facility, the operation vehicle held by the holding device is transported by the intermediate transport assembly, and is then placed on the third travel path on the vehicle placement portion of the second transport vehicle. The second transport vehicle can thus transport the operation vehicle to any of the first travel paths.

Each of the plurality of first travel paths and the third travel path may include a rail on which the operation vehicle travels. The operation vehicle may include a switcher switchable between a facing state in which the switcher faces a lower surface of the rail from below with a clearance between the switcher and the lower surface and a non-facing state in which the switcher does not face the lower surface of the rail when viewed in a travel direction along the travel path. In the facing state, the switcher may come in contact with the lower surface of the rail to restrict falling of the operation vehicle on the first travel path in a path extending direction in which the travel path extends and to restrict transfer of the operation vehicle from the first travel path to the third travel path. In the non-facing state, the switcher may restrict transfer of the operation vehicle from the third travel path to the first travel path.

With this structure, in the facing state, the switcher restricts falling of the operation vehicle traveling along the first travel path. In the non-facing state, the switcher restricts transfer of the operation vehicle from the third travel path to the first travel path. To transfer the operation vehicle from the third travel path to the first travel path, the switcher is to be switched to the facing state to restrict falling of the operation vehicle. In other words, the operation vehicle cannot travel along the first travel path with the switcher being in the non-facing state. The operation vehicle can thus avoid falling on the first travel path and increase the operator safety. In the facing state, the switcher restricts transfer of the operation vehicle from the first travel path to the third travel path. Thus, the operation vehicle cannot transfer from the first travel path to the third travel path with the switcher being in the facing state. The operator can thus remember to return the switcher from the facing state to the non-facing state.

The article storage may include a pair of rails defining the travel path. Each of the pair of rails may have a traveling surface on which the transport vehicle travels, and an article support surface located above the traveling surface to support the article. The traveling surface may extend in a path extending direction in which the travel path extends. The article support surface may extend in the path extending direction to support a plurality of the articles arranged in the path extending direction. The mount may be on the article support surface of each of the pair of rails. The elevator in the holding device placed on the mount may lower the operation vehicle to place the operation vehicle on the traveling surface.

The article storage facility with this structure includes a pair of rails defining each travel path. Each of the pair of rails has an article support surface to support an article. The mount for receiving the holding device is located on the article support surface. The article storage facility with this structure can also easily place the operation vehicle in the operation area.

The travel path may include a travel restrictor at an end to restrict travel of the operation vehicle. The operation vehicle may include a stopper having a state changeable between an overlapping state in which the stopper overlaps the travel restrictor and a non-overlapping state in which the stopper does not overlap the travel restrictor when viewed in a travel direction along the travel path. In the overlapping state, the stopper may be in contact with the travel restrictor and may restrict travel of the operation vehicle.

This structure can restrict, in the overlapping state of the stopper, unintentional movement of the operation vehicle carrying the operator out of the travel path at the end of the path. The structure also easily allows, in the non-overlapping state of the stopper, movement of the operation vehicle out of the travel path.

The holding device may have substantially the same bottom dimensions as the article.

With this structure, the transporter for transporting articles can also be used to transport the operation vehicle held by the holding device, eliminating a dedicated transporter for the operation vehicle. This allows easy transport of the operation vehicle held by the holding device to the operation area.

INDUSTRIAL APPLICABILITY

The technique according to the embodiments of the present disclosure is applicable to an article storage facility including a transport vehicle that transports an article, an article storage that stores the article transported by the transport vehicle, and a transporter that transports the article from a loader to the transport vehicle.

What is claimed is:

1. An article storage facility, comprising:
   a transport vehicle configured to travel along a travel path to transport an article;
   an article storage configured to store the article transported by the transport vehicle;
   a transporter configured to transport the article from a loader to the transport vehicle;
   an operation vehicle configured to travel and carry an operator along the travel path along which the transport vehicle travels; and
   a holding device comprising a holder configured to hold the operation vehicle and an elevator configured to lift and lower the operation vehicle,
   wherein:
   the holder has a state changeable between a holding state in which the holder holds the operation vehicle and a non-holding state in which the holder does not hold the operation vehicle,
   the holding device with the holder holding the operation vehicle is transported by the transporter from the loader and is placed on a mount located along the travel path, and
   the state of the holder in the holding device placed on the mount is changed to the non-holding state and the elevator lowers the operation vehicle to place the operation vehicle on the travel path.

2. The article storage facility according to claim 1, wherein:
   the holder comprises a support and a state changer,
   in the holding state of the holder, the support intersects with a lifting-lowering area through which the operation vehicle is lifted and lowered, and supports the operation vehicle from below,
   when the operation vehicle is lifted by the elevator and located above and spaced from the support, the state changer is operable to remove the support out of the lifting-lowering area and change the state of the holder to the non-holding state, and
   when the support is out of the lifting-lowering area, the elevator lowers the operation vehicle to a position at which the operation vehicle is placed on the travel path.

3. The article storage facility according to claim 2, wherein:
   the operation vehicle comprises:
   a vehicle body comprising a wheel to travel along the travel path,
   a plurality of posts extending from the vehicle body, and
   a lateral bar connecting adjacent posts of the plurality of posts,
   the holding device comprises a frame configured to surround the operation vehicle to be held,
   the support is detachably attached to the frame with a fastener included in the state changer at a position to support, from below, the lateral bar in the operation vehicle to be held,
   the elevator comprises a connector connectable to the operation vehicle, and a lifter attached to the frame, and
   the lifter lifts the connector to lift the operation vehicle connected to the connector.

4. The article storage facility according to claim 1, wherein:
   the article storage comprises a plurality of first travel paths in the travel path along which a first transport vehicle being the transport vehicle travels, and a second travel path extending in a direction intersecting with the plurality of first travel paths when viewed from above or below,
   the transporter comprises a second transport vehicle configured to travel along the second travel path, and an intermediate transport assembly configured to transport the article from the loader to the second transport vehicle,
   the second transport vehicle comprises a vehicle placement portion on which the first transport vehicle is placeable, and a third travel path included in the travel path and located on the vehicle placement portion,
   the mount is included in the second transport vehicle, and
   the elevator in the holding device placed on the mount lowers the operation vehicle to place the operation vehicle on the third travel path.

5. The article storage facility according to claim 4, wherein:
   each of the plurality of first travel paths and the third travel path comprises a rail on which the operation vehicle travels,
   the operation vehicle comprises a switcher switchable between a facing state in which the switcher faces a lower surface of the rail from below with a clearance between the switcher and the lower surface and a non-facing state in which the switcher does not face the lower surface of the rail when viewed in a travel direction along the travel path,
   in the facing state, the switcher comes in contact with the lower surface of the rail to restrict falling of the operation vehicle on the first travel path in a path extending direction in which the travel path extends and to restrict transfer of the operation vehicle from the first travel path to the third travel path, and
   in the non-facing state, the switcher restricts transfer of the operation vehicle from the third travel path to the first travel path.

6. The article storage facility according to claim 1, wherein:
   the article storage comprises a pair of rails defining the travel path,
   each of the pair of rails has a traveling surface on which the transport vehicle travels, and an article support surface located above the traveling surface to support the article,
   the traveling surface extends in a path extending direction in which the travel path extends, the article support surface extends in the path extending direction to support a plurality of the article arranged in the path extending direction, the mount is on the article support surface of each of the pair of rails, and the elevator in the holding device placed on the mount lowers the operation vehicle to place the operation vehicle on the traveling surface.

7. The article storage facility according to claim 1, wherein:

the travel path comprises a travel restrictor at an end to restrict travel of the operation vehicle, the operation vehicle comprises a stopper having a state changeable between an overlapping state in which the stopper overlaps the travel restrictor and a non-overlapping state in which the stopper does not overlap the travel restrictor when viewed in a travel direction along the travel path, and in the overlapping state, the stopper is in contact with the travel restrictor and restricts travel of the operation vehicle.

8. The article storage facility according to claim 1, wherein:

the holding device has substantially the same bottom dimensions as the article.

* * * * *

UNITED STATES PATENT AND TRADEMARK OFFICE
CERTIFICATE OF CORRECTION

PATENT NO. : 12,466,646 B2  
APPLICATION NO. : 18/212782  
DATED : November 11, 2025  
INVENTOR(S) : Takanori Nakamura Page 1 of 1

It is certified that error appears in the above-identified patent and that said Letters Patent is hereby corrected as shown below:

In the Claims

Column 18, Line 30, Claim 4, delete "path included" and insert -- path --

Signed and Sealed this  
Third Day of February, 2026

John A. Squires  
*Director of the United States Patent and Trademark Office*